UNITED STATES PATENT OFFICE.

LORENZ ACH, OF MANNHEIM-WALDHOF, ALBERT ROTHMANN, OF HEIDELBERG, AND HERMANN DIETERICH, OF MANNHEIM, GERMANY, ASSIGNORS TO FARBWERKE VORM. MEISTER LUCIUS & BRUENING, OF HÖCHST-ON-THE-MAIN, GERMANY, A FIRM.

ART OF PREPARING 2-CHLORO-4-AMINOBENZENE-1-ARSINIC ACIDS.

1,156,045.     Specification of Letters Patent.     Patented Oct. 12, 1915.

No Drawing.     Application filed January 26, 1914. Serial No. 814,591.

*To all whom it may concern:*

Be it known that we, LORENZ ACH, ALBERT ROTHMANN, and HERMANN DIETERICH, citizens of the German Empire, residing at Mannheim-Waldhof, Heidelberg, and Mannheim, Germany, respectively, have invented certain new and useful Improvements in the Art of Preparing 2-Chloro-4-Aminobenzene-1-Arsinic Acids; and we do hereby declare the following to be a full, clear, and exact description of the invention, such as will enable others skilled in the art to which it appertains to make and use the same.

This invention relates to the art of preparing aromatic arsenic compounds and has more especially for its object the preparation of 2-chlorobenzene-1-arsinic acids containing in p-position to the arsinic rest the group $N<^{R_1}_{R_2}$, where $R_1$ designates alkyl and $R_2$ any univalent radical such as hydrogen or alkyl. Of the chlorin substitution products of p-aminobenzene arsinic acid and its derivatives hitherto only such were known, which contain the chlorin in m-position to the arsinic group. These compounds differ from the non-chlorinated bodies in possessing a greater degree of toxical properties (*cf. Berichte der Deutschen Chemischen Gesellschaft*, Band 43, S. 531). For this reason they have not found permanent use in therapeutics. We have however made the remarkable discovery that such in the amino group substituted p-aminobenzene arsinic acids which contain the chlorin in o-position to the arsinic group are much less poisonous for the organism of mammals than the corresponding non chlorinated arsinic acids, surpassing these bodies on the other hand in their bactericidal action or microörganisms such as for example the *Spirochæta*. The preparation of these new substances is carried out by treating 3-chloro-1-aminobenzenes bearing one or two substituents in the amino group and having the general formula

where $R_1$ may denote alkyl and $R_2$ any univalent radical such as hydrogen or alkyl with arsenic tri chlorid, whereupon 2-Cl-4-N$<^{R_1}_{R_2}$-benzene-1-arsinic oxids are formed. By oxidation for instance with hydrogen peroxid, potassium permanganate, mercuric oxid, etc., these arsenic oxids readily can be converted into the corresponding arsinic acids.

In the preparation of the new arsinic acids it is not necessary to isolate the intermediate 2-Cl-4-N$<^{R_1}_{R_2}$-benzene-1-arsenic oxids. The two operations of forming the arsenic oxids and of oxidizing these also can be carried out simultaneously. The new substances obtained by this process may likewise be used as starting materials for the preparation of other therapeutical useful bodies.

The following examples embodying what we consider the preferred manner of carrying out the process comprised in our invention are given to fully disclose the same.

Example 1: 155 gm. m-chloro-dimethyl-anilin are heated together with 186 gm. arsenic trichlorid for 10 minutes on the water bath and are then poured into 500 cc. of water. After solution has taken place 500 cc. 10 times normal caustic soda solution are added whereupon the chlorodimethylamino-benzene arsenic oxid, which first separates out goes into solution. The solution is filtered and the unaltered m-chlorodimethyl-anilin removed by extraction with ether. The oxid is then precipitated from the alkaline solution in the form of a light precipitate by addition of hydrochloric acid until the reaction of the solution is weakly alkaline. The precipitate is filtered off, washed with water and dried. It is a white powder melting at 88° C. It is readily soluble in chloroform and benzene and also in dilute acids, insoluble in alcohol and ether. Concentrated hydrochloric acid converts it into the hydrochloric acid salt of 2-chloro-4-dimethylamino-benzene-1-arsinic trichlorid, a substance which melts at 116° C. and is readily soluble in alcohol acetone and water. Aqueous alkaline solution reconverts this body into the arsenic oxid. The conversion of 2-chloro-4-dimethylamino-benzene-1-arsenic oxid into the corresponding arsinic acid is carried out as follows.

10 gm. of the 2-chloro-4-dimethylamino-benzene-1-arsenic oxid are suspended in 180 cc. of water and heated for a short time with 10 gm. of red oxid of mercury. The solution is then made alkaline with carbonate of soda, filtered and the 2-chloro-4-dimethyl-amino-benzene-1-arsinic acid is separated from the liquor by acidulating. Or one may dissolve 10 gm. of the arsenic oxid in dilute caustic soda solution and add 6.2 gm. potassium permanganate in small portions. After filtering the arsinic acid is precipitated with acetic acid. 2-chloro-4-dimethylamino-benzene arsinic acid is a white powder, melts above 300° C. and is insoluble in cold water and alcohol. It dissolves more readily in hot alcohol and in concentrated hydrochloric acid and glacial acetic acid. In aqueous alkaline solution it is readily soluble.

Example 2: 14.1 gm. m-chloro-monomethylanilin are heated together with 37.2 gm. arsenic trichlorid for 40 minutes on the water bath while stirring. Thereby the temperature of the mixture is highly raised and after a few minutes the greenish color is changed into brown. When the reaction is finished the whole is poured into the 10 times quantity of water and caustic alkali is added until alkaline reaction takes place. The unaltered base separated thereby is removed by extracting with ether. By acidulating the strong alkaline solution the 4-methylamino-2-chlorobenzene-1-arsenic oxid goes out in form of white colored flocks in the dried state it forms a white amorphous powder melting at 120° and decomposing when heated above this point. It is readily soluble in acetone, chloroform and alcohol. In order to form the corresponding arsinic acid 2.31 gm. 4-methylamino-2-chlorobenzene-1-arsenic oxid may be suspended in 5 cc. of water and then an aqueous solution of caustic soda may be added until solution has taken place. By adding a little surplus of diluted hydrogen peroxid firstly a large precipitate is formed which goes into solution soon after. Then the solution is acidulated and the product of the reaction separates. The thus obtained 4-methylamino-2-chlorobenzene-1-arsinic acid is a white powder, its melting point being 211° C. It is insoluble in cold water, acetone and chloroform, soluble in hot water and alcohol.

What we claim and desire to secure by Letters Patent is:

1. The process of preparing aromatic arsenic compounds which consists in treating chlorinated aromatic compounds containing in m-position to the chlorin atom the group

(where $R_1$ denotes alkyl and $R_2$ a univalent radical) with arsenic trichlorid and oxidizing the resultant arsenic oxid.

2. The process of preparing aromatic arsenic compounds which consists in treating chlorinated benzenes containing in m-position to the chlorin atom the group

(where $R_1$ denotes alkyl and $R_2$ a univalent radical) with arsenic trichlorid and oxidizing the resultant arsenic oxid.

3. The process of preparing aromatic arsenic compounds which consists in treating chlorinated benzenes containing in m-position to the chlorin atom the group

(where $R_1$ denotes alkyl) with arsenic trichlorid and oxidizing the resultant arsenic oxid.

4. The process of preparing aromatic arsenic compounds which consists in treating chlorinated benzenes containing in m-position to the chlorin atom the group

with arsenic trichlorid and oxidizing the resultant 4-N$<^{CH_3}_H$-2-Cl-benzene-1-arsenic oxid.

5. The process of preparing aromatic arsenic compounds which consists in treating chlorinated aromatic compounds containing in m-position to the chlorin atom the group

(where $R_1$ denotes alkyl and $R_2$ a univalent radical) with arsenic trichlorid and oxidizing the resultant arsenic oxid with potassium permanganate in alkaline solution.

6. As a new class of compositions of matter aromatic compounds containing arsenic in the oxidized state and bearing in o-position to the arsenic rest a chlorin atom and in p-position the group

(where $R_1$ designates alkyl and $R_2$ a univalent radical), these substances being solid and of white color and being soluble in hot alcohol and having great bactericidal action.

7. As a new class of chemical compounds 2-chloro-4-N$<^{R_1}_{R_2}$-benzene-1-arsenic acids (where $R_1$ designates alkyl and $R_2$ a univalent radical), these substances being white colored and solid, being soluble in hot water, hot alcohol and in aqueous solutions of caustic alkalis and alkali carbonates and having a great bactericidal action.

8. As a new composition of matter the 4-$N\genfrac{}{}{0pt}{}{CH_3}{H}$-2-chlorobenzene-1-arsenic acid, this substance being insoluble in cold water, acetone and chloroform, soluble in hot water and alcohol, being white colored and having a great bactericidal action.

In testimony whereof we hereunto affix our signatures in the presence of two witnesses.

LORENZ ACH.
ALBERT ROTHMANN.
HERMANN DIETERICH.

Witnesses:
    HANS HABZIG,
    S. S. BERGER.